United States Patent
Xiao et al.

(10) Patent No.: US 12,229,802 B2
(45) Date of Patent: Feb. 18, 2025

(54) EFFICIENT STORAGE FOR SEGMENT STORE

(71) Applicant: Beijing YoJaJa Software Technology Development Co., Ltd., Beijing (CN)

(72) Inventors: Xingpeng Xiao, Beijing (CN); Yanhui Shi, Beijing (CN); Wen Luo, Beijing (CN); Mengyang Jiang, Beijing (CN); Junhao Zhou, Beijing (CN)

(73) Assignee: Beijing YoJaJa Software Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/338,290

(22) Filed: Jun. 20, 2023

(65) Prior Publication Data

US 2024/0403919 A1    Dec. 5, 2024

Related U.S. Application Data

(63) Continuation of application No. PCT/CN2023/097961, filed on Jun. 2, 2023.

(51) Int. Cl.
*G06Q 30/02* (2023.01)
*G06Q 30/0251* (2023.01)

(52) U.S. Cl.
CPC ..... *G06Q 30/0269* (2013.01); *G06Q 30/0254* (2013.01)

(58) Field of Classification Search
CPC ............ G06Q 30/0269; G06Q 30/0254
See application file for complete search history.

(56) References Cited

U.S. PATENT DOCUMENTS

2020/0341977 A1* 10/2020 Doh ..................... G06F 16/3344
2022/0374404 A1* 11/2022 Johnson ................. H03M 7/30

OTHER PUBLICATIONS

Lemire et al., Consistently faster and smaller compressed bitmaps with Roaring, 2016, Software Practice and Experience, vol. 46, pp. 1547-1569 (Year: 2016).*
Schulze, Introducing Inverted Indices in Clickhouse, 2023, https://clickhouse.com/blog/ clickhouse-search-with-inverted-indices, pp. 1-18 (Year: 2023).*
Wang et al. (An Experimental Study of Bitmap Compression vs. Inverted List Compression, 2017, SIGMOD '17: Proceedings of the 2017 ACM International Conference on Management of Data, https://dl.acm.org/doi/10.1145/ 3035918.3064007, pp. 993-1008 (Year: 2017).*
Variable-Length Quantity, "Wikipedia", May 4, 2023, https://en.wikipedia.org/wiki/Variable-length_quantity#Zigzag_encoding, 6 pages.

* cited by examiner

*Primary Examiner* — John Van Bramer
(74) *Attorney, Agent, or Firm* — Kwan & Olynick LLP

(57) ABSTRACT

In some embodiments, a method analyzes a characteristic of a segment list for a user identifier, and compares the characteristic for the segment list to two or more thresholds. A storage type is determined for the segment list based on the comparing. A value for the segment list is stored using a storage type from a plurality of storage types based on the characteristic for the segment list meeting a threshold for the storage type from the two or more storage types. The method stores the value for the segment list in storage, wherein the value is stored based on the storage type.

20 Claims, 9 Drawing Sheets

| User ID | Segment List |
|---|---|
| 1000 | [A] |
| 1001 | [A, C, E, G, I, K, M, O, Q, S, U, W, Y] |
| 1002 | [A, B, C, D, E, F, G, H, I, J, K, L, M, N, O, P, Q, R, S, T, U, V, W, X, Y, Z] |

EFFICIENT STORAGE FOR SEGMENT STORE

CROSS REFERENCE TO RELATED APPLICATIONS

This application is a continuation application and, pursuant to 35 U.S.C. § 120, is entitled to and claims the benefit of earlier filed application International App. No. PCT/CN2023/097961, filed Jun. 2, 2023, entitled "EFFICIENT STORAGE FOR SEGMENT STORE", the content of which is incorporated herein by reference in its entirety for all purposes.

BACKGROUND

A segment store may store segments for every user account of a system. The segments may represent characteristics of users. For example, some segments may include different age ranges (e.g., 18-26 years, 27-35 years, etc.), gender, location, etc. There may be upwards of 20,000 different possible segments for characteristics. For each user account, a list of segments that is applicable to that user account is stored in the segment store.

One conventional solution may store the segments for all user accounts in a slice in the segment store. The slice may be composed of multiple chunks, and each chunk may store a segment list for a portion of the users, such as sixteen users per slice. In each chunk, the user identifier is stored along with the segment list in an array. This solution may use a large amount of storage, which increases as the number of segments in the segment store increases. Additionally, in some cases, segment lists need to be accessed in a time efficient manner. However, using the above storage solution may be slow when accessing a large amount of segment lists for users. If each chunk stores sixteen users, a system needs a segment mapping relationship that maps the user identifiers to the specific chunks. Thus, to find a segment list, the system needs to determine the chunk in which a user identifier is stored, and then search the user identifiers in the chunk to determine the user identifier and associated segment list.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 3 depicts an example of a table that includes user identifiers (ID) and associated segment lists for the user identifiers.

DETAILED DESCRIPTION

Described herein are techniques for a storage system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

Figure 1:
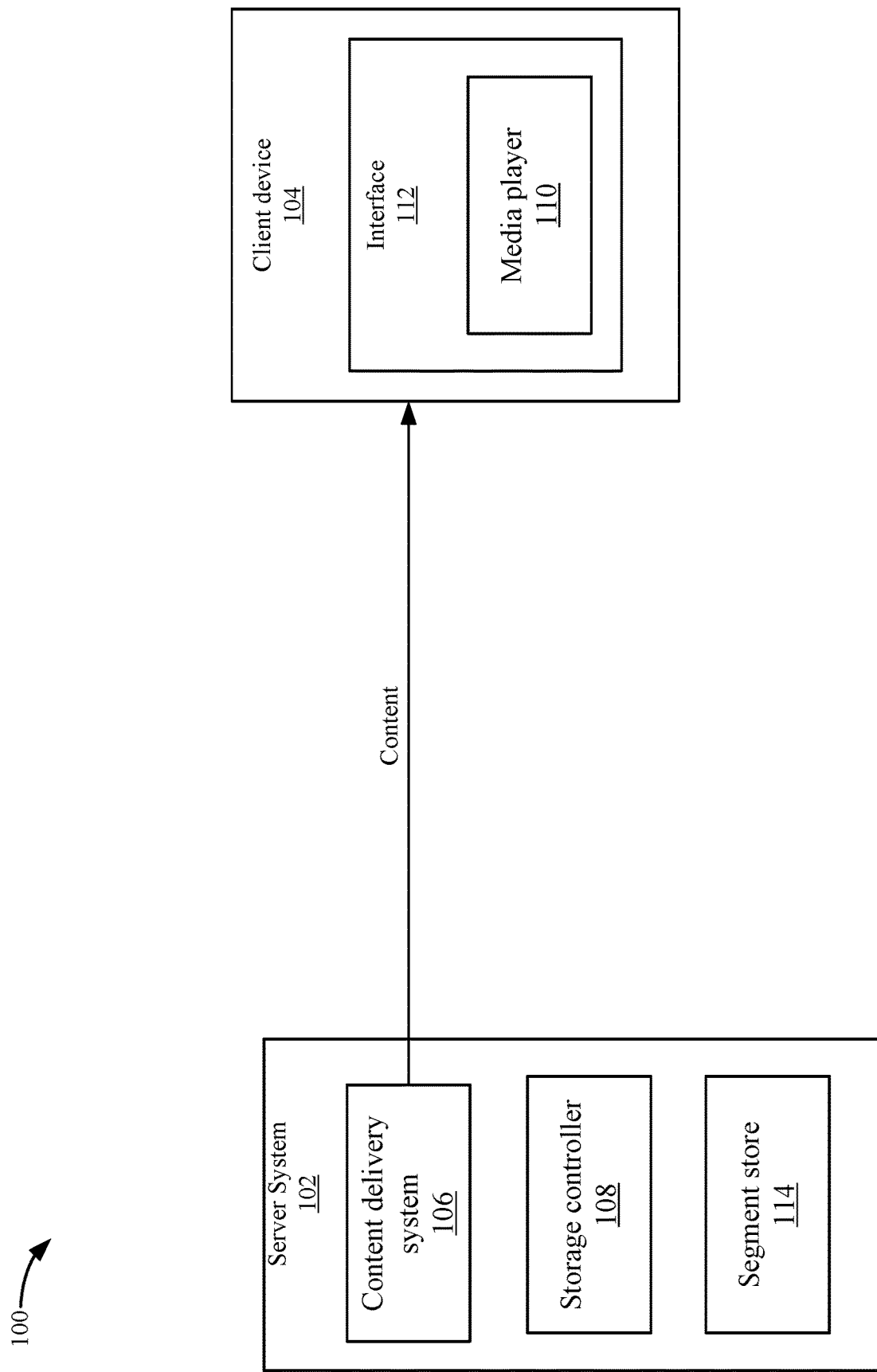
FIG. 1 depicts a simplified system for storing segments according to some embodiments.

FIG. 1 depicts a simplified system 100 for storing segments according to some embodiments. System 100 includes a server system 102 and a client device 104. Although single instances of server system 102 and client device 104 are shown, multiple instances may be appreciated. For example, one or more servers of server system 102 may be performing actions described herein with multiple client devices 104.

In some embodiments, a content delivery system 106 may deliver content to client device 104. For example, the content may include videos, audio, text, etc. Client device 104 may display the content in a media player 110 on interface 112. In some embodiments, the client device 104 may display supplemental content during the display of main content from content delivery system 106. For example, advertisements may be displayed during breaks of a video being played back on media player 110.

During the operation of content delivery system 106, user characteristics for a user account that is using client device 104 may be needed. For example, the user characteristics may be used to perform actions, such as determining content to recommend to the user account, determining relevant supplemental content to display during the delivery of main content, or to perform other actions.

A storage controller 108 may store segments for user accounts based on characteristics of the user accounts. A segment may be associated with a characteristic. For example, a characteristic may include age, gender, location, device type, etc. There may be upwards of 20,000 segments that are possible. One segment may be an age range of 18-25 years, a second segment may be an age range of 26-35, a third segment may be a gender of male, a fourth segment may be a gender of female, a fifth segment may be a location of location X, a sixth segment may be location of location Y, a seventh segment may be device type A, an eight segment may be device type B, etc.

User identifiers for user accounts may be associated with different segments based on characteristics of a user account. For example, first user identifier may have a segment list that lists the segments for the age range of 26-35, location X, and male, and a second user identifier may have a segment list that lists the segments for an age range of 18-25, location Y, and female.

Segment store 114 may be a database system that stores the user identifiers and information for associated segment lists. Storage controller 108 may use different storage types to efficiently store the user identifiers and information for associated segment lists in segment store 114. In some embodiments, the storage process may use two or more storage types to store data, such as a first storage type, a second storage type, and a third storage type may be used. A bitmap may be used to indicate which segments are associated with a user identifier, where bits may be set to "1" to indicate the user identifier is associated with a segment or set to "0" to indicate the user identifier is not associated with the segment. However, for some user identifiers, the bitmap may not be the most efficient way to store information for segment lists. For example, the bitmap may be too sparse or too dense. For some user identifiers, a first storage type may be based on when the bitmap is too sparse, such as an array storage type. An array may be a data structure that stores a sequence of elements based on the number of segments. Each element may be identified by its associated index and represents a position within the sequence. The second storage type may be based on when the bitmap is too dense, such as a run-length encoding storage type. Run-length encoding may break the segment list into several runs in which segment indices are adjacent. For each run, storage controller 108 may use a tuple in the format of (P. L) where P is the starting position for the run and L represents the length of the run. Run-length encoding achieves compression by replacing sequences of repeated values with the representation of P. L. For example, eight consecutive values of "one" may be represented by (0,8) using run length encoding. The value of zero indicates the start point in the sequence and the value of eight indicates the length in which the value runs. The third storage type may be the bitmap, which may be used when the first storage type and the second storage type are not used. As will be discussed in more detail below, the use of the storage types may be an efficient storage process that may use less storage. Additionally, the efficient storage process may allow for the retrieval of segment lists faster.

Storage controller 108 may determine which storage type to use without having to compress a segment list using all three storage types and select which one uses the less storage. For example, storage controller 108 may compute multiple thresholds that are used to select which storage type to use when storing information for a segment list for a user identifier. Then, storage controller 108 can compare a characteristic (e.g., length) of the segment list to the thresholds to select a storage type. This optimal selection of storage type and methodology improves the speed at which a storage type can be selected and also uses less computing resources to store the data.

The following will now describe the storage process in more detail.

Key and Value Format

Figure 2:
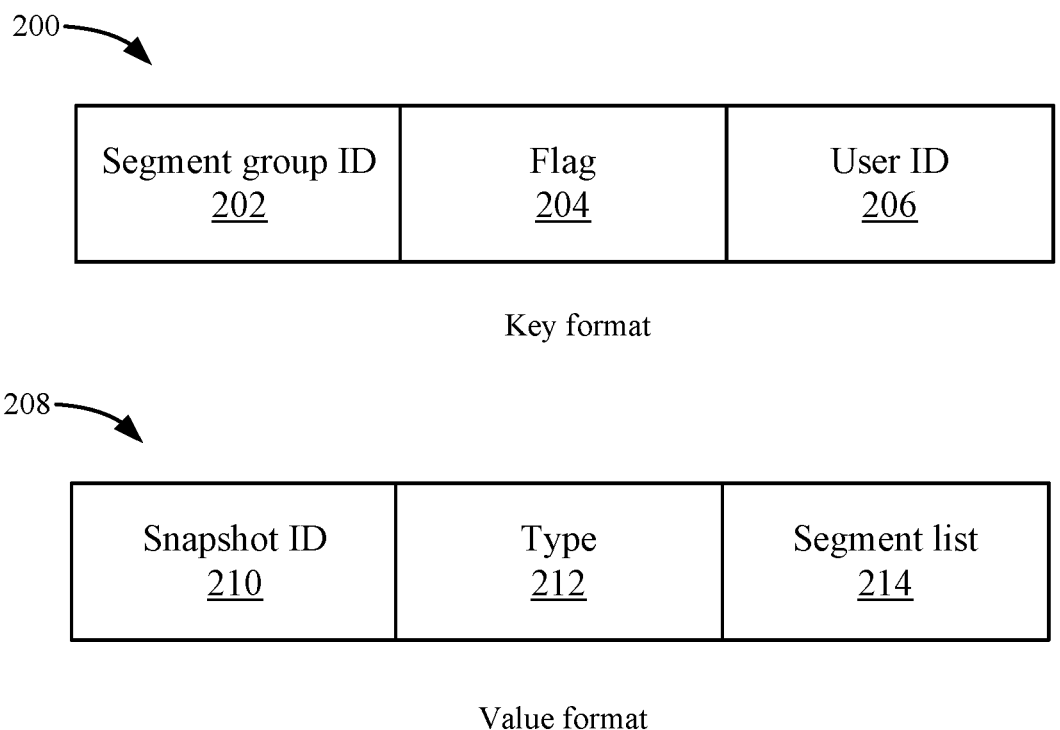
FIG. 2 depicts an example of the key format and value format according to some embodiments.

Segment store 114 may include key storage and value storage to store key value pairs for user identifiers and segment lists. The key storage may include a key format that is used to store keys and the value storage may include a value format that is used to store values for the keys. FIG. 2 depicts an example of the key format and value format according to some embodiments. At 200, the key format may include a segment group identifier (ID) 202, a flag 204, and a user identifier (ID) 206. The segment group ID may be an identifier for different groupings. For example, a segment group may include the user identifiers for a first type of service and a second segment group may include user identifiers for a second type of service. Another segment group may be user identifiers that meet a combination of characteristics, such as the user accounts that are within a certain age group are in one segment group and user accounts that are within a second age group are in a second segment group. Flag 204 may be used to store information about the key type or virtual version of the key. Flag 204 may also indicate other information. User identifier 206 may be information for the user identifier that is associated with the value for the key. The user identifier may be optional if the key does not refer to a user identifier. Although the above format is described, other formats may be used for the key, such as the segment group or flag may not be used.

The key may be compressed to reduce the storage requirements. In some embodiments, segment group ID may be compressed using a compression algorithm, such as a varint algorithm may be used to compress segment group ID 202. The varint algorithm may be a variable length integer compression that may compress integers efficiently. The varint algorithm may represent each integer using a variable number of bytes depending on the value being encoded instead of using a fixed number of bytes. In other embodiments, storing the integer in a fixed number of bytes may be used to compress the segment group ID. Four bytes may be used because the unique segments number may be less than 4294967295 with a maximum int32 number. For example, the value of an integer of "1" is stored as [0x00, 0x00, 0x00, 0x01] and a value of an integer of "1000000" is stored as [0x00, 0x0f, 0x42, 0x40]. Also, other methods of compressing the segment group ID may be used.

Flag 204 may be a fixed one byte flag that may indicate the virtual version and key type. User identifier 206 may be compressed into a fixed number of bytes, such as 16 bytes. The compression may use a globally unique identifier (GUID) that may compress the user identifiers uniquely. The globally unique identifier may be a 128-bit value that is represented as a sequence of 32 hexadecimal digits grouped into five sections separated by hyphens, such as "550e8400-e29b-41d4-a716-116655110000". Other methods of representing user identifiers may also be used.

At 208, a value format is shown that includes a snapshot identifier (ID) 210, a type 212, and a segment list 214. Snapshot ID 210 may be based on the snapshot of segment store 114. For example, a snapshot may be taken of the data in segment store 114 at a point in time. The snapshot may represent the present structure of the data stored in segment store 114. At another time, another snapshot may be taken, and that snapshot is assigned another snapshot ID. The snapshot ID allows for a versioning of the values. A snapshot ID may be provided for each segment group ID. For example, snapshots for each segment group may be used. Type 212 may indicate the storage type that is used. For example, the value of type 212 may indicate which storage type was used to store segment list 214. Snapshot ID 210 may be compressed, such as using the varint algorithm. Type 212 may be 1 byte, which is used to distinguish the storage type for segment list 214. For example, each storage type may be identified by a different value in type 212.

Segment list 214 may be used to store information for the associated segment list for user ID 206. One method of storing segment list 214 may use a mapping to an index of segments in a bitmap. In some embodiments, there may be N number of unique segments in a data set. For example, there may be 26 total unique segments of A, B, C, D, E, F, G, H, I, J, K, L, M, N, O, P, Q, R, S, T, U, V, W, X, Y, Z. The segment A may be the gender of male, the segment B may be the gender of female, the segment C may be the location X, the segment D may be the location Y, etc.

Storage controller 108 may sort the unique segments in an array based on frequency of occurrence. One example of the frequency array is ["A", "C", "E", "G", "I", "K", "M", "O", "Q", "S", "U", "W", "Y", "B", "D", "F", "H", "J", "L", "N", "P", "R", "T", "V", "X", "Z"]. The index of the segments found in the segment list may be used to determine which segments are associated with a user identifier. For example, a value of "1" indicates the user identifier includes that segment and a value of "0" indicates the user identifier does not include the segment. If a user identifier has a segment A, which is at an index "0" of the segment array, and a segment C, which is at the index value of "2", and no other segments, the bitmap may be 26 bits of "10100000000000000000000000". For some user identifiers, the bitmaps may be either too sparse or too dense. For example, some user identifiers may have a sparse bitmap, such as "10100000000010000000010000", which only includes a small fraction of bits that are "1". Also, the bitmap may be too dense, such as a bitmap of "11111111111111111111111000", which includes a large run of the same value of "1". To increase the efficiency of storage, storage controller 108 may use storage types other than the bitmap storage type, such as an array storage type and a run-length encoding storage type, to improve the compression of segment list 214.

An array may be a data structure that stores a sequence of elements. Each element may be identified by its associated index and represents a position within the sequence. Each segment's index may be compressed one by one without including all the bits of the bitmap. For example, the values of [0,2] may be stored in an array when a user identifier has a segment A, which is at an index "0" of the segment array, and a segment C, which is at the index value of "2". The array may achieve compression over a bitmap by storing indices of segments that are associated with the user identifier and not the indices of segments that are not associated with the user identifier.

Run-length encoding may break the segment list into several runs in which segment indices are adjacent. For each run, storage controller 108 may use a tuple in the format of (P. L) where P is the starting position for the run in the index and L represents the length of the run. Run-length encoding achieves compression by replacing sequences of repeated values with the representation of P. L. For example, eight consecutive values of "1" starting at the index value of "0" may be represented by (0, 8) using run length encoding. The value of "0" indicates the start point and the value of "8" indicates the length in which the value runs. The value may also be compressed to reduce the storage used.

Storage Type Compression Process

The following will describe the use of storage types to store data in segment store 114 according to some embodiments. FIG. 3 depicts an example of a table 300 that includes user identifiers (ID) and associated segment lists for the user identifiers. A column 302 lists the user identifiers and a column 304 lists the respective segment list for user identifiers. The user identifiers include the values of "1000", "1001", and "1002". The respective segment lists are shown at 306, 308, and 310. As shown, user identifier 1000 includes the segment list ["A"], user identifier 1001 includes the segment list of ["A", "C", "E", "G", "I", "K", "M", "O", "Q", "S", "U", "W", "Y"], and user identifier 1001 includes the segment list of ["A", "B", "C", "D", "E", "F", "G", "H", "I", "J", "K", "L". "M", "N", "O", "P", "Q", "R", "S", "T", "U", "V". "W", "X", "Y", "Z"]. In this example, there are a total of 26 unique segments in segment store 114, but in other examples, different numbers of unique segments may be present.

Figure 4:
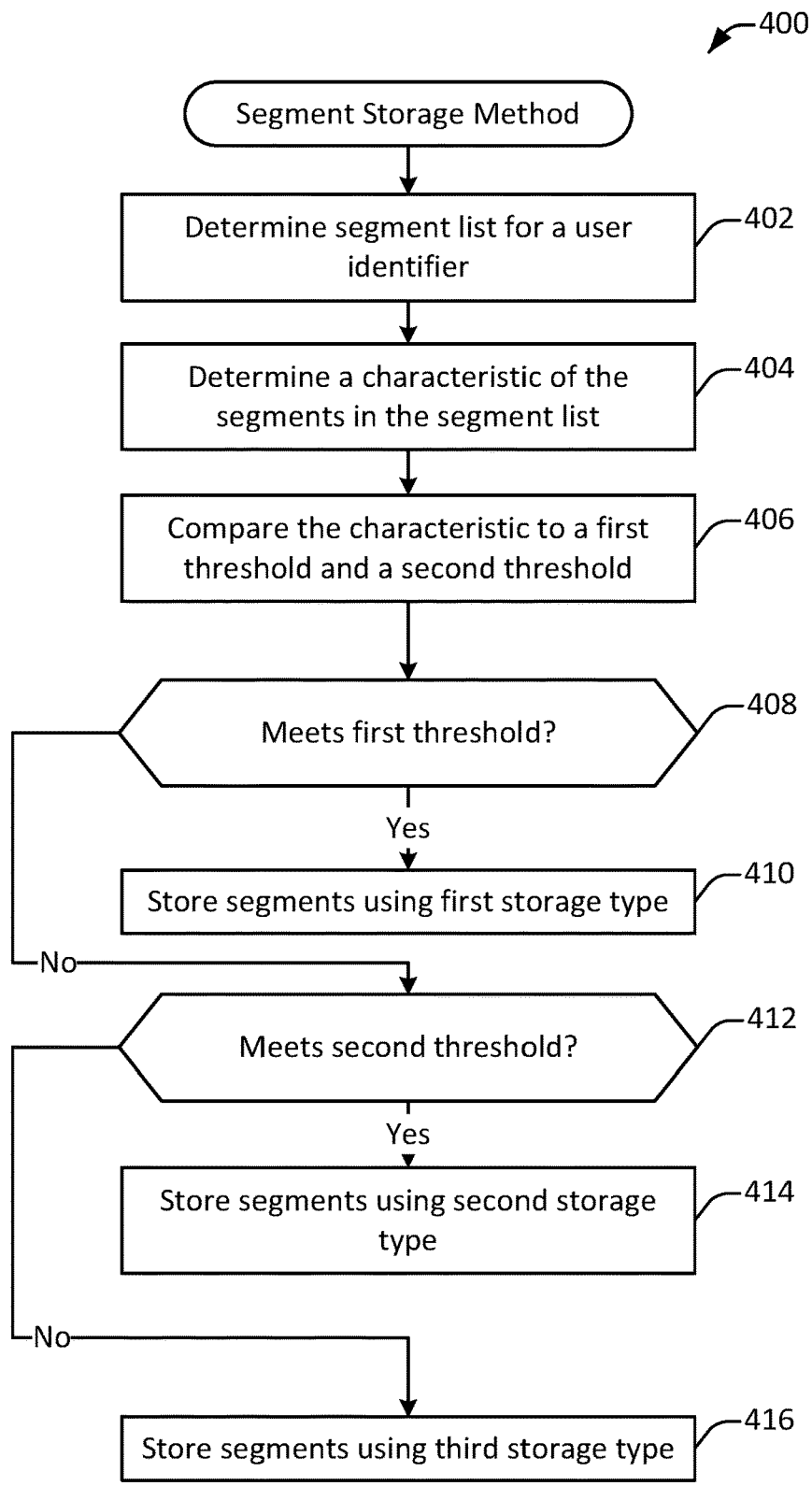
FIG. 4 depicts a simplified flowchart of a method for storing segments using a storage type according to some embodiments.

FIG. 4 depicts a simplified flowchart 400 of a method for storing segments using a storage type according to some embodiments. The process may use multiple thresholds to determine which storage type to use to store a segment list in segment store 114. The thresholds may be used to improve the determination of which storage type to use. A segment list could be compressed using all three storage types and then compress the result that uses less storage is selected. However, this process may not be efficient as multiple compression processes need to be run. Accordingly, storage controller 108 may determine thresholds that can be used to efficiently select a storage type for a segment list. The thresholds may select a storage type that may most likely store an associated segment list in the most efficient manner by using the least amount of storage. The determination of the threshold values will be described in more detail below in FIG. 6.

In the process to select a storage type, at 402, storage controller 108 determines a segment list for a user identifier. For example, the segment list at 306, 308, or 310 may be determined.

At 404 storage controller 108 determines a characteristic, such as a length, of the segments in the segment list. The length may be based on a number of segments that are associated with the user identifier, and not the segments that are not associated with the user identifier. For example, the length for the segment list at 306 for user identifier 1000 is "1" because there is one segment of "A", the length of the segment list at 308 for user identifier 1001 is "13" because there are thirteen segments, and the segment list length for user identifier 1002 at 310 is "26" because there are twenty six segments in the segment list. The length may be determined in other ways, such as by a number of bits, bytes, etc. that are used.

At 406, storage controller 108 compares the characteristic to a first threshold and a second threshold. In some embodiments, the first threshold may be a first length, such as "4", and the second threshold may be a second length, such as "25". In some embodiments, the second threshold may be larger than the first threshold. The thresholds may be associated with different conditions that are used to select storage types. For example, the first threshold is associated with a value that when met, a first storage type is used, the second threshold is associated with a second value that when met, a second storage type is used, and when neither of the two thresholds are met, a third storage type is used. Although two thresholds are described, the process of determining storage types may be different, such as three or more thresholds may be used for the storage types, or other methods of selecting among storage types may be used, such as using a prediction network, different conditions, etc.

At 408, storage controller 108 determines if the first threshold is met. By meeting the first threshold, the length may be less than or equal to the first threshold, but other conditions may be met, such as the length is less than the first threshold. If the first threshold is met at 410, storage controller 108 stores information for the segments using the first storage type, such as using the array storage type. In some examples, the length of "1" for user identifier 1000 meets the first threshold. In this case, the raw bitmap storage for user identifier 1000 is "10000000000000000000000000". The index for segment A is "0", and the value of zero is stored in a first position of an array to indicate the segment A is included in the segment list. The value can be compressed. The compressed version of "0" is "0". The hexadecimal representation of "0" is [0x00] in an array, which may be one byte. The compression result for a segment list for the array type is [0x00]. The one byte may be less than four bytes needed to store the bitmap. In another example, if the bitmap is "00100000000000000000000000", the index for segment C is "2", and the value of two is stored in a first position of the array. The compressed value of "2" is [0x02] in an array, which uses one byte.

If the first threshold is not met, at 412, storage controller 108 determines if the second threshold is met. If the second threshold is "25", the second threshold may be met by being greater than or equal to the value of "25". Other conditions may also be used, such as being greater than the second threshold. If the second threshold is met, at 414, storage controller 108 stores segments using a second storage type, such as run length encoding. User identifier 1002 may meet the second threshold because the length of the segment list is twenty six segments. In this case, the raw bitmap storage for user identifier 1002 is "11111111111111111111111111". Accordingly, there is a total of one run of the value of "1" that is from index 0 to 25, both inclusive, and the length is 26. In run-length encoding, the value of "P", is 0 because the position starts at index 0 and the value of "L" is 26 because the length of the run is 26. This results in a tuple of (0, 26), which is (0x00,0x1a) in hexadecimal. The result that is stored is [0x00, 0x1a] in an array, which uses two bytes as the storage space. The two bytes may be less than four bytes needed to store the bitmap.

If the first threshold and the second threshold are not met, at 416, storage controller 108 stores segments using the third storage type, which may be a raw bitmap. To not meet the first threshold and the second threshold, the segment list length may be larger than the first threshold, but less than the second threshold. User identifier 1001 has a raw bitmap of "1111111111111000000000000". When converted to bytes, the raw bitmap may be [0xFF, 0xF8], which uses two bytes to store the segment list (e.g., the last two bytes of [0x00] may be trimmed and removed. For the Array, the number of bytes used may be 13 of [0x01, 0x02, 0x03, 0x04, 0x05, 0x06, 0x07, 0x08, 0x09, 0x0a, 0x0b, 0x0c]. For run-length encoding, the number of bytes used may be two of [0x00, 0x0d]. While run-length encoding may use the same number of bytes, the compression process may be more efficient using the raw bitmap representation. That is, the compression of the raw bitmap may use less storage space than the compression of the run-length encoding representation.

Storage controller 108 may store the keys associated with the user identifiers with the respective information for segment lists that are stored using the storage type. After storing the information for the segment lists along with the keys, requests may be processed. The following will now describe processing requests.

Request Processing

Figure 5:
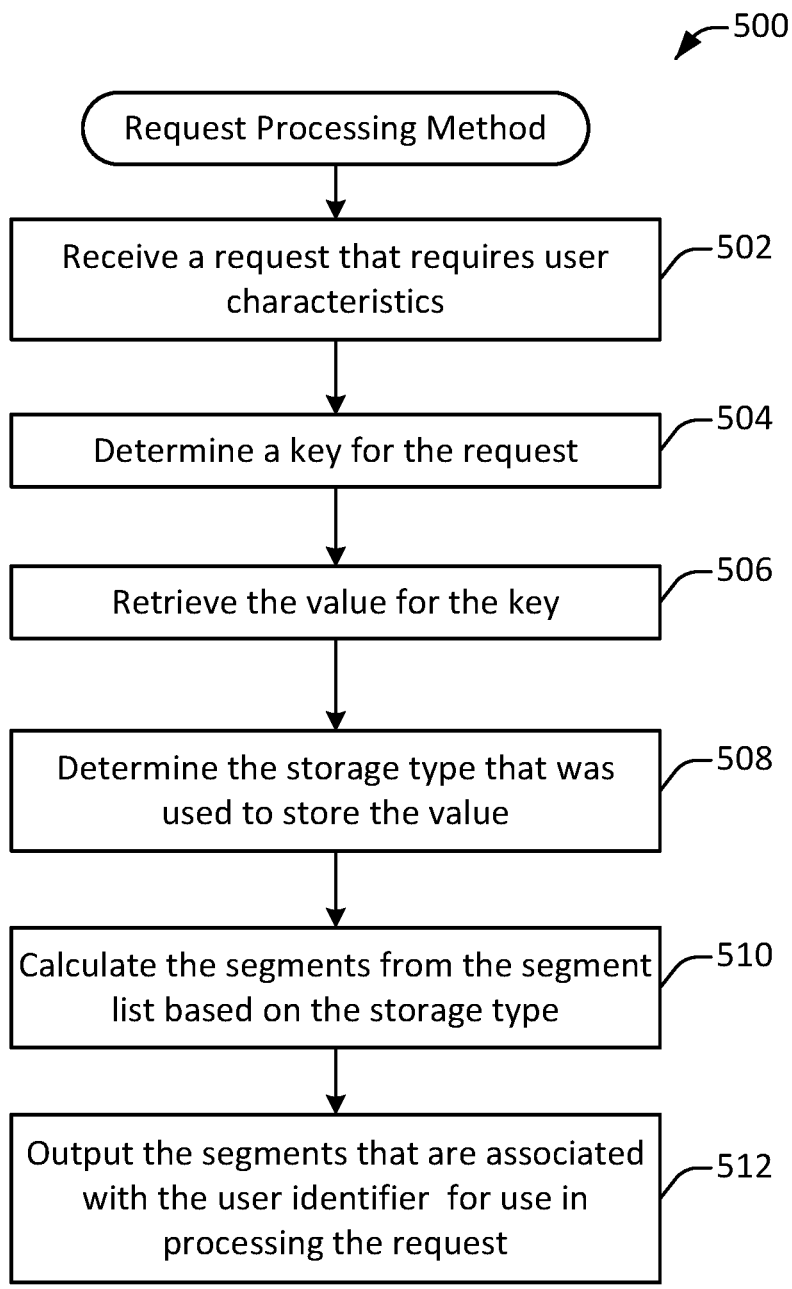
FIG. 5 depicts a simplified flowchart of a method for processing requests according to some embodiments.

FIG. 5 depicts a simplified flowchart 500 of a method for processing requests according to some embodiments. Segment list 214 is retrieved when a request for user segments for a user account is received. For example, when supplemental content is to be displayed during a video, segment list 214 is retrieved from segment store 114. The retrieval may be time constrained, which requires segment list 214 to be retrieved in a limited amount of time. The time constraint may be because a video is being played and a break is coming up in which supplemental content needs to be determined for the break using the user segments. Other time constraints may also be appreciated.

At 502, content delivery system 106 receives a request that requires user characteristics. In some embodiments, a request for supplemental content may be received from client device 104. Content delivery system 106 may determine supplemental content that is targeted to the user characteristics of the user account that is viewing content on client device 104. Accordingly, content delivery system 106 may send a request to storage controller 108 for the segment list that is associated with a user identifier for the user account.

To determine the segment list, at 504, storage controller 108 determines a key for the request. Storage controller 108 may determine the key using a segment group identifier, a flag, and a user identifier for the user account. The segment group identifier may be the segment group that is associated with the request. The flags may be the virtual version and key type. The user identifier may be the compressed user identifier for the user account. Storage controller 108 determines the key by combining the three elements in the key format.

At 506, storage controller 108 retrieves the value for the key from segment store 114. For example, storage controller 108 may retrieve the value from a hash table by querying the hash table. Storage controller 108 may take a hash of the key and then submit the query to the table to retrieve the value associated with the hash value. The retrieval of values using the hash of the key may be faster compared to the conventional solution, which may have used a binary search algorithm to find the segment list for a given user identifier. For example, the chunk may have to have been located and then the user identifier is searched for in the chunk. However, some embodiments use a hash table that can be queried using a single query with the hash value, which is much faster than the binary search.

At 508, storage controller 108 determines the storage type that was used to store the value. For example, storage controller 108 uses the type 212 in the value format to determine the storage type that was used, such as a first value may indicate a bitmap array was used, a second value indicates an array is used, and a third value indicates run-length encoding was used. At 510, storage controller 108 calculates the user segments from the information in the segment list based on the storage type. For example, storage controller 108 maps from the information for segment list that was stored to the index of segments. This determines the segments for the user identifier. For example, the segments may be sorted by frequency as ["A", "C", "E", "G", "I", "K", "M", "O", "Q", "S", "U", "W", "Y", "B", "D", "F", "H", "J", "L", "N", "P", "R", "T", "V", "X", "Z"]. Then, a value of "0" and a storage type of array may indicate the segment A is associated with the user identifier. Also, the value of (0, 26) and a storage type of run-length encoding may indicate the twenty six segments of ["A", "C", "E", "G", "I", "K", "M", "O", "Q", "S", "U", "W", "Y", "B", "D", "F", "H", "J", "L", "N", "P", "R", "T", "V", "X", "Z"] are associated with the user identifier. Similarly, the value of "1111111111111000000000000" and a storage type of bitmap indicate that the thirteen segments of ["A", "C", "E", "G", "I", "K", "M", "O", "Q", "S", "U", "W", "Y"] are associated with the user identifier.

At 512, storage controller 108 outputs the segments that are associated with the user identifier for use in processing the request. For example, content delivery system 106 may use these segments to determine supplemental content that may be related to the segments for the user identifier.

The following will now describe a method to determine the thresholds.

Threshold Determination

Figure 6:
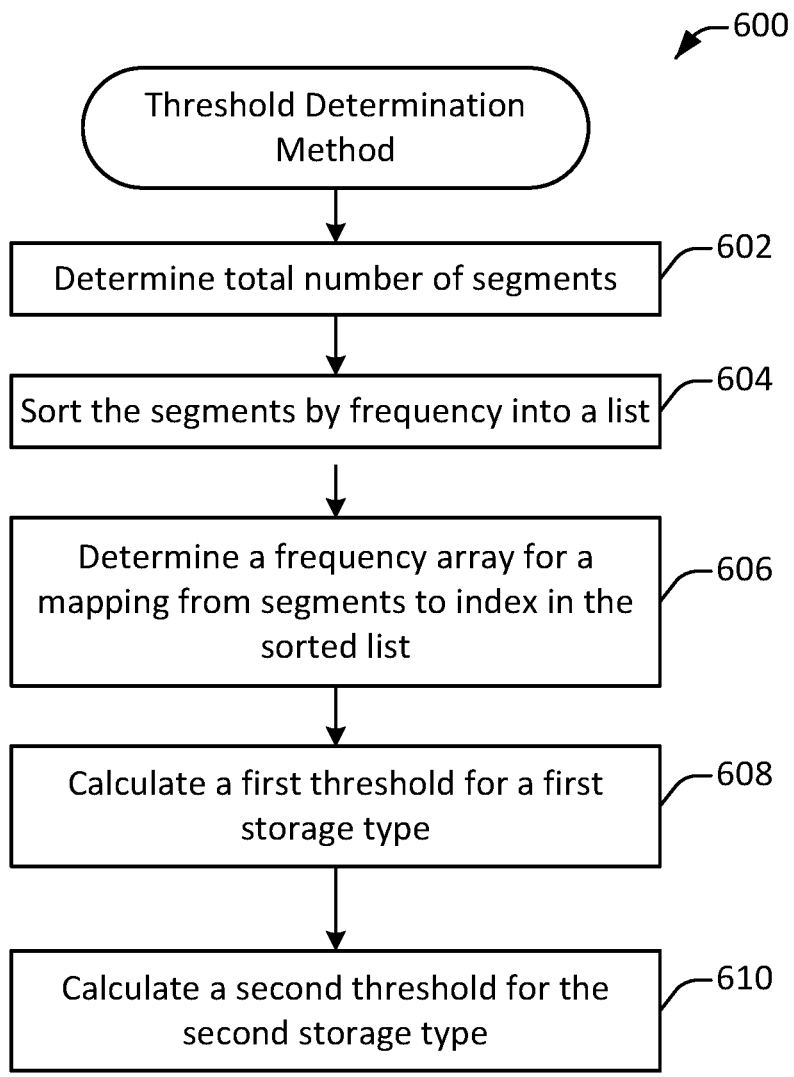
FIG. 6 depicts a simplified flow chart of a method for determining thresholds according to some embodiments.

The thresholds may be used to improve the determination of which storage type to use. As described above, it may not be efficient to compress a segment list using all three storage types and then selecting the result that uses less storage. FIG. 6 depicts a simplified flow chart 600 of a method for determining thresholds according to some embodiments. The following may describe one method of determining thresholds, but other methods may be used. In some embodiments, the following process is used:

The following will describe element 2 above in the process. At 604, storage controller 108 may sort the segments by frequency into a list as ["A", "C", "E", "G", "I", "K", "M", "O", "Q", "S", "U", "W", "Y", "B", "D", "F", "H", "J", "L", "N", "P", "R", "T", "V", "X", "Z"]. The sorted segments may provide a mapping relationship for each segment to its respective index. For example, segment "A" maps to index "0", segment "E" maps to index "2", and segment "Z" maps to index "25", and so on. When generating the segment mapping relationship, storage controller 1. Let
    i) G represents the group.
    ii) S represents the segment.
    iii) R represents the record.
    iv) $T = \text{Len}(\{S \mid S \in G\})$, which represents the length or size of the group G consisting of elements of segment S that satisfy a given condition.
    v) $M = (T + 7) >> 3$, which represents a right shift operation by 3 bits applied to the result of $(T + 7)$.
    vi) $N = \text{Len}(\{S \mid S \in R\})$, which represents the length or size of the record R consisting of elements of segment S that satisfy a given condition.
2. Sort the segments greedily by frequency in one snapshot. Generate an array FreqArray = $[(S0, F0), (S1, F1), (S2, F2), \ldots, (S(n-1), F(n-1))]$ in which
    i) Si is the segment name.
    ii) Fi is the frequency.
    iii) $F0 \geq F1 \geq F2 \geq \ldots \geq F(n-1) > 0$
3. Calculate the first threshold ArrayThreshold.

i) Let $FreqSum = \sum_{i=0}^{n-1} Fi, \; Wi = \dfrac{Fi}{FreqSum}$ ii) For every index $0 \leq i \leq n-1$, calculate the bytes it will use with a compression algorithm, such as the varint algorithm. Let it be Li.
    iii) Then calculate the average bytes for the index of $IndexAverageBytes = \Sigma_{i=0}^{n-1} \; Wi \times Li$ iv) Finally, calculate the array threshold as $ArrayThreshold = \dfrac{M}{IndexAverageBytes}$ 4. Calculate the second threshold RLEThreshold
    i) Let x to be the maximum segments that can be taken from the group G to make the formula $(x + 1) \times IndexAverageBytes \times 2 \leq M$ always true.

ii) This results in $x \leq \dfrac{M}{IndexAverageBytes \times 2} - 1$, i.e. $x \leq \dfrac{ArrayThreshold}{2} - 1$ iii) Then the second threshold is $RLEThreshold = T - x = T - \dfrac{ArrayThreshold}{2} - 1$ 5. If $N \leq ArrayThreshold$, then storage controller 108 stores the segment indices in a record with the Array storage type.
6. If $N \geq RLEThreshold$, then storage controller 108 stores the segments with the run length encoding storage type. Otherwise, storage controller 108 stores the segments with the Raw Bitmap.

The following will describe the above process in more detail. The value for "G" may be the segment group G. The value for "S" may be the segment name. The value for "R" may be a record in a table in segment store 114, such as the record is the key (e.g., user identifier) and value (e.g., segment list). The value for "T" may be the length of the segments that are stored in segment store 114. The value for "M" may be the most bytes that can be used to store a record with the raw bitmap type. The value of M may also be Ceil (T/8), which is the ceiling of T/8 (e.g., the value of T divided by 8 and rounding it up to the nearest integer). The value of "N" may be the length of segments for a user identifier.

At 602, storage controller 108 determines a total number of segments T. For example, from FIG. 3, there may be a total of 26 unique segments [A, B, C, D, E, F, G, H, I, J, K, L, M, N, O, P, Q, R, S, T, U, V, W, X, Y, Z] in the dataset. This may be a simplified example, and there may be many more segments in other examples. The value of M may be determined from T, which is (26+7)>>3=4.

108 sorted the segments greedily by its frequency so that the variable integers may use the least storage space overall. This may use less storage when the segment mapping relationship is in the random order. Then, at 606, a frequency is added to generate a frequency array of FreqArray=[('A', 3), ('C', 2), ('E', 2), ('G', 2), ('I', 2), ('K', 2), ('M', 2), ('O', 2), ('Q', 2), ('S', 2), ('U', 2), ('W', 2), ('Y'. 2), ('B', 1), ('D', 1), ('F', 1), ('H', 1), ('J', 1), ('L', 1), ('N', 1), ('P', 1), ('R', 1), ('T', 1), ('V', 1), ('X', 1), ('Z', 1)]. The frequency array may indicate the frequency of occurrence of each respective segment. For example, segment "A" occurs three times in table 300, segment "C" occurs two times, . . . . Segment Z occurs one time, etc.

At 608, storage controller 108 calculates a first threshold for a first storage method in element 3 in the above process, which may be the array storage type. In some embodiments, storage controller 108 may calculate the frequency sum, that is, the sum of frequency for every segment. The frequency sum may be: FreqSum=sum ([3, 2, 2, 2, 2, 2, 2, 2, 2, 2, 2, 2, 2, 1, 1, 1, 1, 1, 1, 1, 1, 1, 1, 1, 1, 1])=40. That is, there are 40 segments in table 300. Second, storage controller 108 may calculate the frequency weight for each segment by using segment frequency divided by the frequency sum. The following will produce the weight list of W=[0.075, 0.05, 0.05, 0.05, 0.05, 0.05, 0.05, 0.05, 0.05, 0.05, 0.05, 0.05, 0.05, 0.025, 0.025, 0.025, 0.025, 0.025, 0.025, 0.025, 0.025, 0.025, 0.025, 0.025, 0.025, 0.025]. Third, storage controller 108 may calculate how many bytes will be used to store the index for each segment. Different compression algorithms may be used to encode the index, such as varint, a fixed number of bytes (e.g., four bytes), or other compression algorithms. The varint-encoded index array may be: L=[1, 1, 1, 1, 1, 1, 1, 1, 1, 1, 1, 1, 1, 1, 1, 1, 1, 1, 1, 1, 1, 1, 1, 1, 1]. Each index value may be one byte. Then, storage controller 108 calculates the average bytes for the index. The average bytes can be determined by multiplying the index length with the weight for each segment, then summing them. The index average bytes may be: IndexAverageBytes=0.075x1+0.05x1+0.05x1+0.05x1+0.05x1+0.05x1+0.05x1+0.05x1+0.05x1+0.05x1+0.05x1+0.05x1+0.05x1+0.025x1+0.025x1+0.025x1+0.025x1+0.025x1+0.025x1+0.025x1+0.025x1+0.025x1+0.025x1+0.025x1+0.025x1=1.0. Finally, storage controller 108 generates the array threshold by dividing M by IndexArrayBytes which is 4:1.0, and we will get ArrayThreshold=4.

At 610, storage controller 108 calculates a second threshold for the second storage type in element 4 in the above process, which may be the run-length encoding storage type. Given a full raw bitmap, such as a bitmap of 26 bits, the storage controller 108 may attempt to take away X segments. That will yield x+1 runs. For each run, storage controller 108 will need to store the run with the tuple (P, L). The storage bytes for P and L are both the average bytes for an index. To make sure the second storage type uses less storage than the bitmap, storage controller 108 uses a process to determine the threshold such that (x+1)×IndexAverageBytesx2≤M is always true, which means x=1 in the example. For example, $$RLEThreshold = T - x = T - \frac{ArrayThreshold}{2} \mp 1 = 26 - \left(\frac{4}{2}\right) + 1 = 25,$$

when 1-2v and ArrayThreshold=4.

In elements 5 and 6 above, the value of N for a user identifier, which is the number of segments associated with the user identifier, may be compared to the two thresholds. If the value N is less than or equal to the ArrayThreshold, then storage controller 108 stores the indices for the segments in the segment list in an array. If the value N is greater than or equal to the RLEThreshold, then storage controller 108 stores the indices for the segments in the segment list using runs. Otherwise, if no thresholds are met, then a raw bitmap is used to store the indices for both the segments in the segment list and segments not in the segment list.

Storage Efficiency

Figure 7:
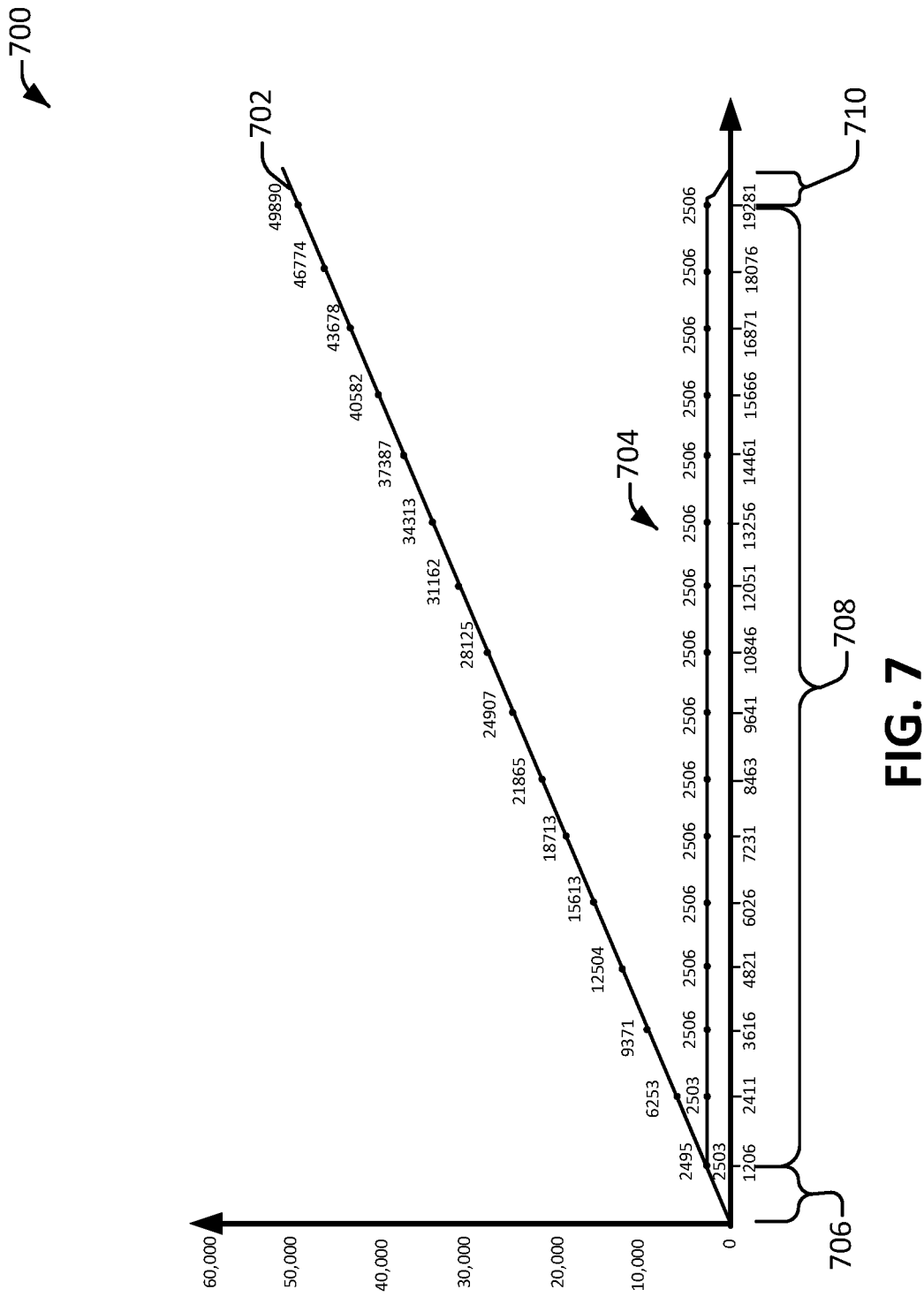
FIG. 7 depicts a graph showing the use of storage according to some embodiments.

The above process provides many advantages. For example, the different storage types may use less storage. Compressing the user identifier using a compression algorithm may use less bytes compared to storing the user identifier in an array. Also, using the three storage types may use less storage. FIG. 7 depicts a graph 700 showing the use of storage according to some embodiments. The X-axis may be the length of segments in a segment list and the Y-axis is the storage used. At 702, a line shows the storage used by a conventional method of storing segments in an array for the segment list. As can be seen, the storage size increases as the segment list size increases in a linear way. In an array, as the number of segments increases, the array uses more storage linearly to store more indices. However, a line 704 shows the amount of storage used based on the present process of using multiple storage types. At 706, storage size may increase when the number of segments in the segment list increases in a linear way because an array is used. However, at 708, the storage size that is used is maintained at a steady level as the storage type is changed to the bitmap storage. The bitmap storage may store the different combinations in a fixed number of bytes, such as four bytes. The four bytes may store 4,294,967,296 different combinations. Then, at 710, the storage size decreases as less storage is used. As the length of the number of segments increases, when a point is reached, the amount of storage decreases because the third storage type of run-length encoding may start to be used. This is because run length encoding may use less bytes than the bitmap. Accordingly, starting at 708, the amount of storage that is used is constant because a fixed length bitmap is used for these lengths. In comparison to the previous method, the array that is used continually became larger as more segments were added whereas the bitmap that is used stays the same size. Then, once the third threshold is reached, the amount of storage used goes down.

The retrieval of values is also faster compared to the conventional solution. The conventional solution may have used a binary search algorithm to find the segment list for a given user identifier. For example, the chunk may have to have been located and then the user identifier is searched in the chunk. However, some embodiments use a hash table that can be queried which is much faster than the binary search.

System

Figure 8:
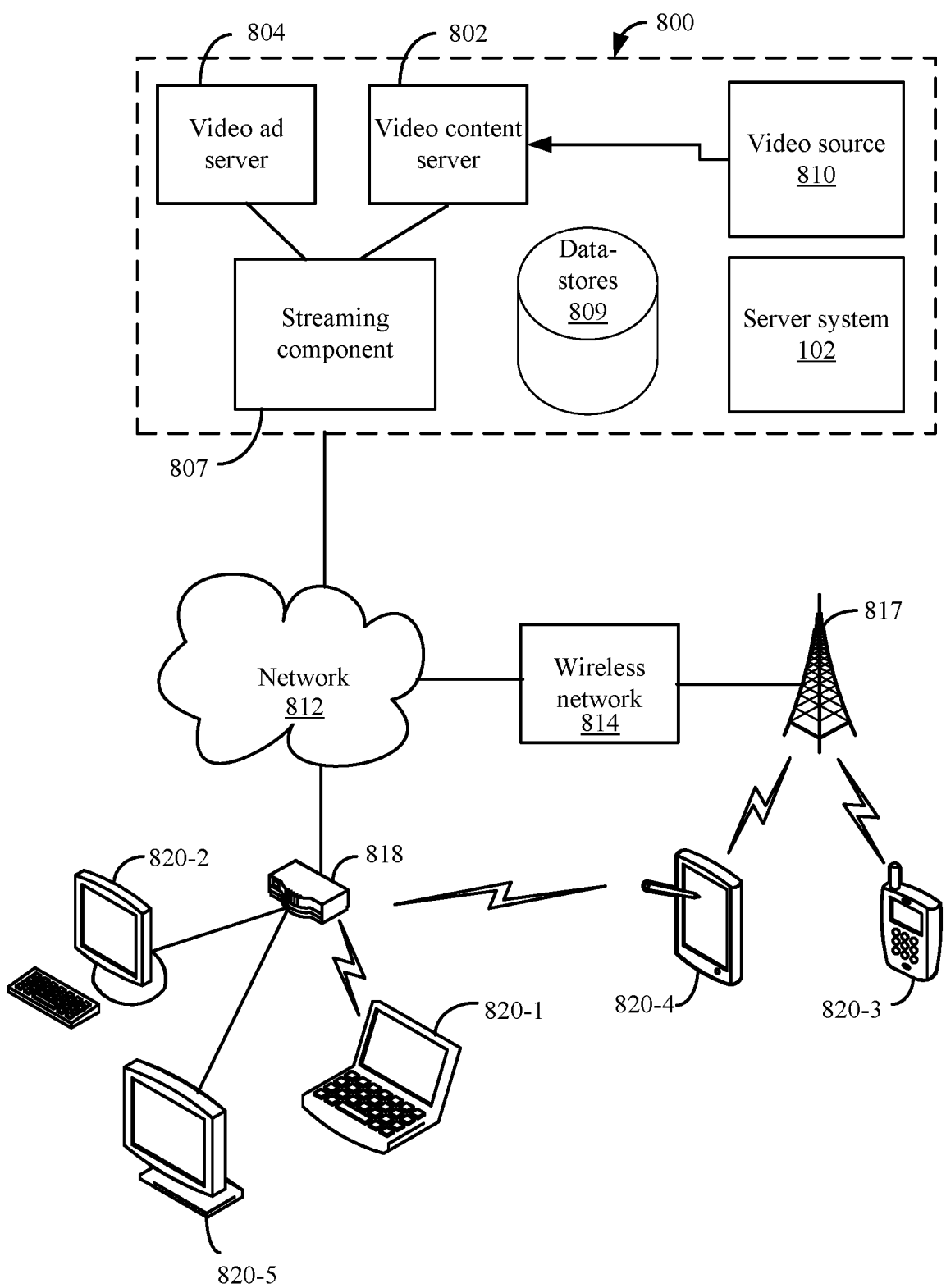
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources, for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided by an advertiser in exchange for payment of some kind or may comprise a promotional message for the system 800, a public service message, or some other information. The video advertising server 804 may serve the video advertising segments as directed by a user interface controller (not shown).

The video streaming system 800 also may include server system 102

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless network 814 (e.g., a wireless cellular telecommunications network (WCS)), or some combination of these or similar networks.

One or more client devices 820 may be in communication with the video streaming system 800, via the data communication network 812, wireless network 814, or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for wireless network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HyperText Transfer Protocol (HTTP) and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
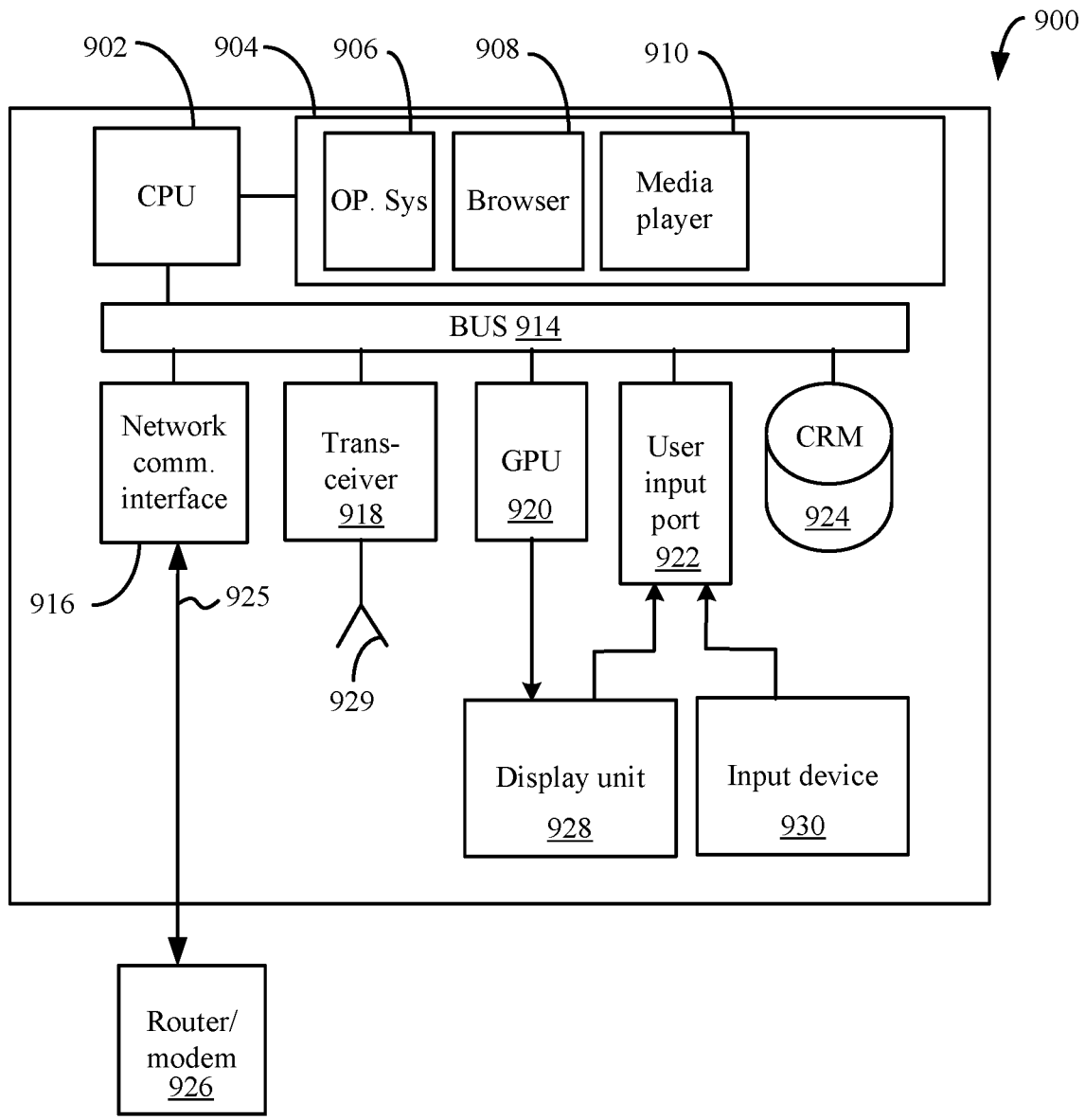
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules for operating system 906, browser 908, and media player 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A network communication (comm.) interface 916 may also be connected to the bus 914. The network communication interface 916 may provide or support two-way data communication between the apparatus 900 and one or more external devices, e.g., the streaming system 800, optionally via a router/modem 926 and a wired or wireless connection 925. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
analyzing, by a computing device, segments for segment lists associated with a plurality of user identifiers to generate an index of segments;

determining, by the computing device, a frequency of respective segments, wherein the frequency is based on a segment being included in one or more segment lists;

calculating, by the computing device, a first threshold for an array storage type based on at least the frequency of respective segments;

calculating, by the computing device, a second threshold for a run-length encoding storage type based on removing x segments from a bitmap storage type based on the x segments being less than or equal to the (first threshold/2)-1;

analyzing, by the computing device, a characteristic of a segment list for a user identifier;

comparing, by the computing device, the characteristic for the segment list to the first threshold and the second threshold, wherein the first threshold and the second threshold are used to determine which of the array storage type, the run-length encoding storage type, and the bitmap storage type to use to store a segment value for the user identifier;

selecting, by the computing device, a storage type from the array storage type, the run-length encoding storage type, and a bitmap storage type for the segment list based on the comparing to the first threshold and the second threshold, wherein the bitmap storage type is selected when the first threshold and the second threshold are not met;

storing, by the computing device, the segment value for the segment list and a type value in a value formate for a key in storage, wherein the segment value is stored using the storage type and the key is associated with the user identifier;

retrieving, by the computing device, the value format using the key for a request that is associated with the user identifier;

determining, by the computing device, a type value stored in the value format, wherein the type value indicates the storage type that was used to store the segment value;

calculating, by the computing device, the segment list using the storage type from the segment value of the value format; and outputting, by the computing device, the segment list to respond to the request.

2. The method of claim 1, further comprising:
determining the key for the user identifier; and
storing the key in association with the segment value and the type value in the storage.

3. The method of claim 1, wherein comparing the characteristic for the segment list to the first threshold and the second threshold comprises comparing a length of the segment list to the first threshold and the second threshold.

4. The method of claim 3, wherein,
the segment list includes a first number of segments that are associated with the user identifier from a second number of segments, and
the length is based on the first number of the segments that are associated with the user identifier.

5. The method of claim 1, wherein comparing the characteristic for the segment list to the first threshold and the second threshold comprises:
using the array storage type when the characteristic meets the first threshold; and
using run-length encoding storage type when the characteristic meets the second threshold.

6. The method of claim 5, wherein comparing the characteristic for the segment list to the first threshold and the second threshold comprises:

using the bitmap storage type when the characteristic does not meet the first threshold and the second threshold.

7. The method of claim 1, further comprising:
determining an array of segments found in the storage; and
determining indices for segments in the segment list based on a position of the segments in the segment list in the array of segments.

8. The method of claim 7, further comprising:
determining the value for the segment list by storing the indices using the array.

9. The method of claim 7, wherein:
the array storage type stores an array the indices,
the run-length encoding storage type uses the indices to store runs, and
the bitmap storage type store bits for the array of segments in a bitmap, wherein bits are set based on the indices for the segments.

10. The method of claim 1, wherein calculating the $(x+1) \times \text{IndexAverageBytes} \leq 2 \leq M$ is true, wherein x is the x segments, IndexAverageBytes is an average bytes for the index of the segments, and M is a most bytes that can be used to store a record with the bitmap storage type.

11. The method of claim 10, wherein calculating the first threshold comprises:
calculating a sum of the frequency of segments for the segment lists associated with the plurality of user identifiers;
calculating a weight for each segment based on a frequency of each segment and the sum;
calculating an amount of storage to store an index for each segment;
calculating an average amount of storage for each segment based on the amount of storage to store the index and the respective weight for the index; and
calculating the first threshold based on the average amount of storage.

12. The method of claim 1, wherein calculating the second threshold comprises:
determining a maximum number of segments that can be taken from the segments for the segment lists associated with the plurality of user identifiers based on an average bytes in an index used in the array storage type and a value for the most bytes that can be used to store a record with the bitmap storage type; and
calculating the second threshold based on the maximum number.

13. The method of claim 1, further comprising:
receiving a request for segments for the user identifier, wherein the response to the request is subject to a time constraint to respond.

14. A non-transitory computer-readable storage medium having stored thereon computer executable instructions, which when executed by a computing device, cause the computing device to be operable for:
analyzing segments for segment lists associated with a plurality of user identifiers to generate an index of segments;
determining a frequency of respective segments, wherein the frequency is based on a segment being included in one or more segment lists;
calculating a first threshold for an array storage type based on the frequency of respective segments;
calculating a second threshold for a run-length encoding storage type based on removing x segments from a bitmap storage type based on the x segments being less than or equal to the (first threshold/2)−1;

analyzing a characteristic of a segment list for a user identifier;

comparing the characteristic for the segment list to the first threshold and the second threshold, wherein the first threshold and the second threshold are used to determine which of the array storage type, the run-length encoding storage type, and the bitmap storage type to use to store a segment value for the user identifier;

selecting a storage type from the array storage type, the run-length encoding storage type, and a bitmap storage type for the segment list based on the comparing to the first threshold and the second threshold, wherein the bitmap storage type is selected when the first threshold and the second threshold are not met; and storing the segment value for the segment list and a type value in a value format for a key in storage, wherein the segment value is stored using the storage type and the key is associated with the user identifier;

retrieving the value format using the key for a request that is associated with the user identifier;

determining a type value stored in the value format, wherein the type value indicates the storage type that was used to store the segment value;

calculating the segment list using the storage type from the segment value of the value formate; and outputting, by the computing device, the segment list to respond to the request.

15. A method comprising:

analyzing, by a computing device, segments for segment lists associated with a plurality of user identifiers to generate an index of segments;

determining, by the computing device, a frequency of respective segments, wherein the frequency is based on a segment being included in one or more segment lists;

calculating, by the computing device, a first threshold in two or more thresholds for a first storage type based on the frequency of respective segments;

calculating, by the computing device, a second threshold in the two or more thresholds for a second storage type, wherein the first threshold and the second threshold are used to determine which of the first storage type, the second storage type, and a third storage type to use to store a value for the user identifier, wherein calculating the second threshold comprises:

determining a maximum number of segments that can be taken from the segments for the segment lists associated with the plurality of user identifiers based on removing x segments from a third storage type based on the x segments being less than or equal to the (first threshold/2)−1;

calculating the second threshold based on the maximum number;

storing, by the computing device, the first threshold and the second threshold;

storing, by the computing device, a segment value for a segment list and a type value in a value format for a key in storage, wherein the segment value is stored using a storage type that is determined based on the first threshold or the second threshold, and the key is associated with a user identifier;

retrieving, by the computing device, the value format using the key for a request that is associated with the user identifier;

determining a type value stored in the value format, wherein the type value indicates the storage type that was used to store the segment value;

calculating the segment list using the storage type from the segment value of the value format; and outputting, by the computing device, the segment list to respond to the request.

16. The method of claim 15, wherein calculating the first threshold comprises:

calculating a sum of the frequency of segments for the segment lists associated with the plurality of user identifiers;

calculating a weight for each segment based on a frequency of each segment and the sum;

calculating an amount of storage to store an index for each segment;

calculating an average amount of storage for each segment based on the amount of storage to store the index and the respective weight for the index; and calculating the first threshold based on the average amount of storage.

17. The method of claim 15, further comprising:

analyzing a characteristic of a segment list for a user identifier;

comparing the characteristic for the segment list to the first threshold or the second threshold;

determining a storage type for the segment list based on the comparing, wherein a value for the segment list is stored using a storage type from a plurality of storage types based on the characteristic for the segment list meeting the first threshold, the second threshold, or not meeting the first threshold and the second threshold; and storing, by the computing device, the value for the segment list in storage, wherein the value is stored based on the storage type.

18. The method of claim 15, wherein:

the first storage type comprises an array storage type, the second storage type comprises a run-length encoding storage type, and the third storage type comprises a bitmap.

19. The method of claim 15, wherein the maximum number of segments is determined based on:

dividing the value for the most bytes by the average bytes in the index.

20. The method of claim 15, wherein the average bytes in the index is determined based on:

determining a weight for each index based on the frequency for each segment; and multiplying the weight for each index by a respective index length.

* * * * *

UNITED STATES PATENT AND TRADEMARK OFFICE
CERTIFICATE OF CORRECTION

PATENT NO. : 12,229,802 B2  
APPLICATION NO. : 18/338290  
DATED : February 18, 2025  
INVENTOR(S) : Xingpeng Xiao et al.

Page 1 of 1

It is certified that error appears in the above-identified patent and that said Letters Patent is hereby corrected as shown below:

In the Claims

In Claim 1, Column 17, Line 29, please correct "formate" to --format--

In Claim 10, Column 18, Line 19, after "wherein calculating the" insert --second threshold for the run-length encoding storage type is determined such that--

In Claim 10, Column 18, Line 20, after "(x+1)×IndexAverageBytes" delete "≤" insert --x--

In Claim 10, Column 18, Line 22, after "index of" delete "the"

In Claim 14, Column 19, Line 26, please correct "formate" to --format--

Signed and Sealed this  
Sixth Day of May, 2025

Coke Morgan Stewart  
*Acting Director of the United States Patent and Trademark Office*